C. W. HUGHES.
NUT LOCK.
APPLICATION FILED FEB. 23, 1912.
1,059,863.
Patented Apr. 22, 1913.
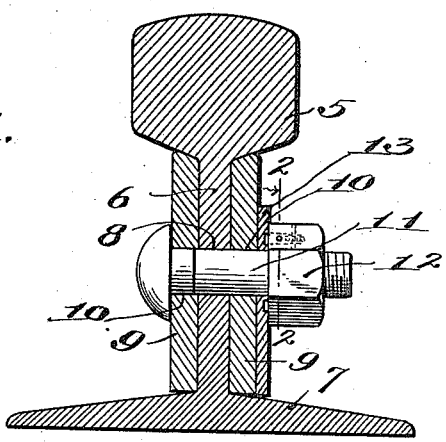
Fig. 1.
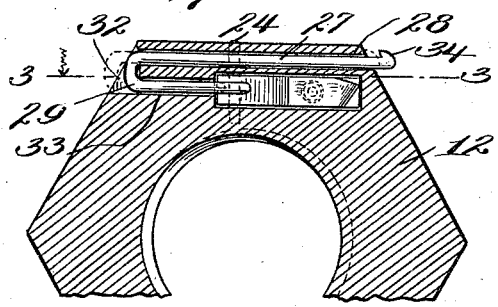
Fig. 2.
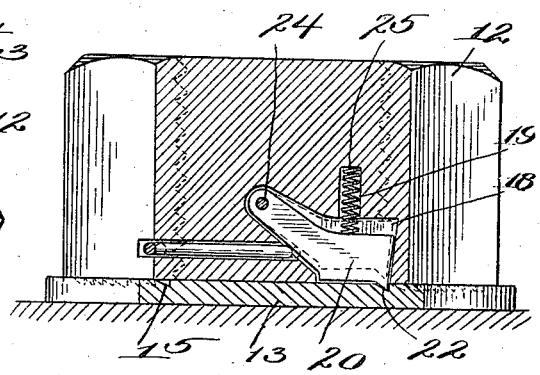
Fig. 3.
Fig. 5.
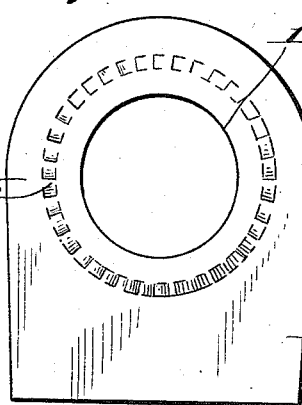
Fig. 4.
Fig. 6.
Witnesses
Chas. S. Hyer
Inventor
Clarence W. Hughes
by
Amos L. Norris Jr.
Atty

UNITED STATES PATENT OFFICE.

CLARENCE W. HUGHES, OF BOOMER, WEST VIRGINIA.

NUT-LOCK.

1,059,863.

Specification of Letters Patent.

Patented Apr. 22, 1913.

Application filed February 23, 1912. Serial No. 679,223.

*To all whom it may concern:*

Be it known that I, CLARENCE W. HUGHES, a citizen of the United States, residing at Boomer, in the county of Fayette and State of West Virginia, have invented new and useful Improvements in Nut-Locks, of which the following is a specification.

This invention relates to nut locks, and the primary object of the invention is to provide an effective means for locking and conveniently releasing the nuts used on the bolts of railroad rail joints and to embody therewith an auxiliary accessory in the form of a washer having a downwardly projecting portion to engage the rail flange and operating also to prevent wear of the nut.

With this and other objects and advantages in view, the invention consists in the construction and arrangement of the several parts which will be more fully hereinafter described and claimed.

In the drawing: Figure 1 is a transverse vertical section through a rail and fish plates and showing a bolt, nut and washer embodying the features of the invention. Fig. 2 is a section on an enlarged scale taken in the plane of the line 2—2, Fig. 1. Fig. 3 is a section taken in the plane of the line 3—3, Fig. 2. Figs. 4, 5 and 6 are detail views of parts of the nut locking devices.

The numeral 5 designates a rail embodying the usual web 6 and base flange 7 and having a bolt hole or opening 8 through the web. Associated with the rail in the usual manner are fish plates 9 each having an opening 10 therein alining with the opening 8. The nut lock comprises a headed bolt 11 inserted through the openings 8 and 10, a nut 12 on the screw-threaded extremity of the bolt and a washer 13 having an opening 14 therethrough surrounded by a circular line of ratchet teeth 15 and constructed with an extension or projecting member 16 adapted to have its lower edge 17 bear on the base flange 7, as shown by Fig. 1. The nut 12 has a horizontally disposed recess 18 opening through the rear face thereof and having a counter-recess 19 communicating therewith. The recess 18 movably receives a dog 20, preferably of the shape shown by Fig. 6, and embodying a head 21 with an outer tooth 22 and a shank 23. The recess 18 is shaped similarly to the dog 20 but of larger dimensions so as to permit the dog to be pressed thereinto to withdraw the tooth 22 from exterior exposure or projection. The dog 20 is pivoted in the recess 18 by means of a pivot pin 24 extending through the terminal of the shank 23 into the body of the nut 12, and seated in the recess 19 is a spring 25 which bears against the outer edge of the dog over a stud 26 on the latter and operates to normally force the dog outwardly.

Movably mounted in the inner portion of the nut adjacent to the dog 20 is a release device embodying a straight shank 27 slidable in a bore 28 extending transversely through the nut from one face to the other, the said shank continuing into a link extremity 29 having a leg 30 whose free terminal is adapted to engage the inner inclined edge 31 of the shank 23 of the dog. The nut has a slot 32 with which the bore 28 communicates and the leg 30 of the link extremity 29 moves in a short bore 33 opening at its inner portion into the recess 18 and at its outer portion communicating with the slot 32. The shank 27 with its link extremity is longer than the maximum cross-sectional extent of the portion of the nut in which the said release device is mounted, and the free extremity of the shank 27 is formed with a head 34 which prevents the release device from becoming disengaged or detached from the nut, the link extremity operating at the opposite side of the nut as a counter obstruction to disengagement of the release device from the nut. Either the free extremity of the shank 27 or the bend of the link extremity 29 is exposed at the opposite sides or faces of the nut, and when the release device is shifted so as to press the link extremity with its leg 30 into the nut the said leg presses against the inclined edge 31 and forces the dog 20 inwardly into the recess 18. When the release device is shifted in the opposite direction the spring 25 is free to act and forces the dog outwardly.

In applying the several parts of the nut lock the washer 16 is first set up against the one fish plate 9 with the lower edge 17 of the member 16 resting against the base flange and the ratchet teeth 15 outermost. The nut 12 is then applied over the threaded end of the bolt 11 and screwed up against the washer, the tooth 22 riding over the ratchet teeth 15 and finally, when the nut is tightened, engaging one of the ratchet teeth to hold the nut against movement, and during the tightening up of the nut the dog 20 may be permitted to project, or if desired it may remain depressed into the recess 18 by properly moving the release device, and after it is screwed fully home the dog may be released to permit the tooth 22 to be fully projected into engagement with one of the ratchet teeth 15.

The particular mode of operation is not essential and may be pursued in accordance with the desire of the user, it being only necessary to effect a positive engagement of the tooth 22 with one of the ratchet teeth 15 when the nut has been tightened up against the washer 13. At any time the nut may be readily released by operating the release device or moving the latter so that the leg 30 will press the dog 20 inwardly into the recess 18 and this movement of the release device may be accomplished by means of the wrench used in applying the nut or by other means.

From the foregoing it will be seen that the nut may be readily locked or released and by means of the interposition of the washer 13 wear on the nut is avoided. Furthermore the nut may be tightened at any time found necessary.

The improved nut locking means will be found exceptionally convenient when necessary to replace worn out rails or to facilitate the shifting of a track line from one position to another.

Though the improved nut lock has been shown applied and particularly described in connection with a rail joint or for use on railroad rails, it will be understood that it may be applied to any device with equal efficiency.

What is claimed is:

1. In a nut lock, the combination of a bolt, a washer applied over the bolt and having ratchet teeth in its outer face, a nut having a main bore extending transversely through the same near the inner face and communicating at one extremity with a counter-bore extending partially through the nut in a plane parallel with the former bore and entering a recess in the body of the nut having a rear outlet, a locking dog mounted in the recess and provided with a projection movable through the outlet of the latter and also having an inclined side edge adjacent to the counter-bore, the dog being engaged by a spring and normally projected inwardly to coöperate with the ratchet teeth of the washer, and a release slide having a long leg movable through the main bore and a shorter leg in the counter-bore to engage the inclined side edge of the dog, the longer leg of the release slide being of greater extent than the bore in which it operates so as to expose opposite portions thereof at the opposite outlets of the bore for engagement by a tool.

2. In a nut lock, the combination of a bolt, a washer mounted over the bolt and having ratchet teeth around the said bolt in its outer side, a nut to engage the bolt provided with a dog pivotally mounted therein and having a tooth projectable through the inner side of the nut, the dog being concealed within the nut and having a spring engaging the outer edge thereof to normally force the tooth through the inner side of the dog, the dog also having an inclined side edge, a main bore and counter-bore extending transversely of the nut, the main bore passing entirely through the nut and the counter-bore partway through the nut and communicating with the main bore at one end of the latter, and a release device freely slidable longitudinally in the nut in a plane parallel with the inner face of said nut and embodying a long leg in the main bore and a shorter leg in the counter-bore, the shorter leg being parallel with the long leg and having its inner end in position to engage the inclined side edge of the dog and press the said dog inwardly against the action of the spring to release the tooth of the dog from the ratchet teeth of the washer.

In testimony whereof I have hereunto set my hand in presence of two subscribing witnesses.

CLARENCE W. HUGHES.

Witnesses:
G. W. SMITH,
G. W. COON.

---

Copies of this patent may be obtained for five cents each, by addressing the "Commissioner of Patents, Washington, D. C."